United States Patent
Yanagishita et al.

(10) Patent No.: US 10,011,693 B2
(45) Date of Patent: Jul. 3, 2018

(54) POLYPROPYLENE FOR MICROPOROUS FILM

(71) Applicant: Prime Polymer Co., Ltd., Minato-ku, Tokyo (JP)

(72) Inventors: Yoshio Yanagishita, Ichihara (JP); Chikara Satou, Ichihara (JP); Satoshi Tamura, Ichihara (JP); Katsutoshi Ohta, Ichihara (JP)

(73) Assignee: PRIME POLYMER CO., LTD., Tokyo (JP)

( * ) Notice: Subject to any disclaimer, the term of this patent is extended or adjusted under 35 U.S.C. 154(b) by 516 days.

(21) Appl. No.: 14/438,599

(22) PCT Filed: Oct. 23, 2013

(86) PCT No.: PCT/JP2013/078720
§ 371 (c)(1),
(2) Date: Apr. 24, 2015

(87) PCT Pub. No.: WO2014/065331
PCT Pub. Date: May 1, 2014

(65) Prior Publication Data
US 2015/0274908 A1    Oct. 1, 2015

(30) Foreign Application Priority Data

Oct. 25, 2012 (JP) .................. 2012-235478

(51) Int. Cl.
| | |
|---|---|
| B01D 71/26 | (2006.01) |
| C08J 7/00 | (2006.01) |
| H01G 11/52 | (2013.01) |
| H01G 9/02 | (2006.01) |
| H01M 2/16 | (2006.01) |
| B29C 55/02 | (2006.01) |
| C08J 5/18 | (2006.01) |
| C08F 110/06 | (2006.01) |
| C08F 112/06 | (2006.01) |
| H01M 10/0525 | (2010.01) |
| B29K 23/00 | (2006.01) |

(52) U.S. Cl.
CPC .............. *C08J 5/18* (2013.01); *B01D 71/26* (2013.01); *B29C 55/02* (2013.01); *C08F 110/06* (2013.01); *H01G 11/52* (2013.01); *H01M 2/1653* (2013.01); *B29K 2023/12* (2013.01); *C08J 2323/12* (2013.01); *H01G 9/02* (2013.01); *H01M 10/0525* (2013.01); *Y02E 60/13* (2013.01)

(58) Field of Classification Search
None
See application file for complete search history.

(56) References Cited

U.S. PATENT DOCUMENTS

| | | |
|---|---|---|
| 4,971,937 A | 11/1990 | Albizzati et al. |
| 4,978,648 A | 12/1990 | Barbe et al. |
| 5,438,110 A | 8/1995 | Ishimaru et al. |
| 6,306,973 B1 | 10/2001 | Takaoka et al. |
| 6,376,628 B1 | 4/2002 | Ikai et al. |
| 6,537,652 B1 | 3/2003 | Kochem et al. |
| 9,068,030 B2 | 6/2015 | Song et al. |
| 9,174,384 B2 | 11/2015 | Nairn et al. |
| 2001/0025090 A1 | 9/2001 | Moriya et al. |
| 2003/0031924 A1 | 2/2003 | Lee et al. |
| 2005/0202958 A1 | 9/2005 | Yoshikiyo et al. |
| 2007/0203299 A1* | 8/2007 | Mavridis ............ C08F 10/06 525/240 |
| 2009/0069515 A1 | 3/2009 | Matsunaga et al. |
| 2009/0203855 A1 | 8/2009 | Matsunaga et al. |
| 2011/0052929 A1 | 3/2011 | Nairn et al. |
| 2011/0159346 A1* | 6/2011 | Yamamoto ............ B32B 27/08 429/144 |
| 2011/0269900 A1 | 11/2011 | Tamura et al. |

(Continued)

FOREIGN PATENT DOCUMENTS

| | | |
|---|---|---|
| CN | 1154670 C | 6/2004 |
| CN | 1199208 C | 4/2005 |
| EP | 0 903 356 A1 | 3/1999 |
| EP | 0 916 701 A1 | 5/1999 |
| EP | 1 538 167 A1 | 6/2005 |
| EP | 2 093 315 A1 | 8/2009 |
| EP | 2 527 376 A1 | 11/2012 |
| JP | H04-218507 A | 8/1992 |
| JP | 09-052917 A | 2/1997 |
| JP | 2723137 B2 | 11/1997 |
| JP | 2776914 B2 | 5/1998 |
| JP | 2774160 B2 | 7/1998 |

(Continued)

OTHER PUBLICATIONS

Office Action issued in Taiwanese Patent Application No. 102138418 dated Jan. 4, 2017.
International Search Report issued in related International Patent Application No. PCT/JP2013/078720, dated Nov. 15, 2013.
An Extended European Search Report issued in European Patent Application No. 13849075.0 dated May 31, 2016.

*Primary Examiner* — Krishnan S Menon
*Assistant Examiner* — Bradley R Spies
(74) *Attorney, Agent, or Firm* — Foley & Lardner LLP

(57) ABSTRACT

[Problem] To provide polypropylene for a microporous film having excellent heat resistance and strength. [Solution] Polypropylene for a microporous film satisfying the following requirements (1) and (2): (1) the weight-average molecular weight (Mw) value, as determined by gel permeation chromatography (GPC), is not less than 100,000 but less than 800,000, the value (Mw/Mn) obtained by dividing the weight-average molecular weight by the number-average molecular weight is more than 7.0 but not more than 12.0, and the value (Mz/Mw) obtained by dividing the Z-average molecular weight by the weight-average molecular weight is not less than 3.8 but not more than 9.0, and (2) the mesopentad fraction, as measured by $^{13}$C-NMR (nuclear magnetic resonance method), is not less than 95.5%.

13 Claims, No Drawings

(56) References Cited

U.S. PATENT DOCUMENTS

| | | |
|---|---|---|
| 2013/0023598 A1 | 1/2013 | Song et al. |
| 2016/0001531 A1 | 1/2016 | Nairn et al. |

FOREIGN PATENT DOCUMENTS

| | | |
|---|---|---|
| JP | H11-297297 A | 10/1999 |
| JP | 2000-204111 A | 7/2000 |
| JP | 2000-290333 A | 10/2000 |
| JP | 2002-284942 A | 10/2002 |
| JP | 2003-519723 A | 6/2003 |
| JP | 2009-057473 A | 3/2009 |
| JP | 2010-248469 A | 11/2010 |
| JP | 2011-246658 A | 12/2011 |
| JP | 2011-246659 A | 12/2011 |
| JP | 2011-246660 A | 12/2011 |
| JP | 2011-256278 A | 12/2011 |
| JP | 2011-256316 A | 12/2011 |
| JP | 2012-064556 A | 3/2012 |
| JP | 2012-092286 A | 5/2012 |
| JP | 2012-092287 A | 5/2012 |
| JP | 2012-092288 A | 5/2012 |
| TW | 201119861 A | 6/2011 |
| WO | WO-97/45463 A1 | 12/1997 |
| WO | WO-2004/016662 A1 | 2/2004 |
| WO | WO-2006/077945 A1 | 7/2006 |
| WO | WO-2008/010459 A1 | 1/2008 |
| WO | WO-2010/079799 A1 | 7/2010 |

\* cited by examiner

POLYPROPYLENE FOR MICROPOROUS FILM

TECHNICAL FIELD

The present invention relates to polypropylene for a microporous film which has wide-ranged condition of raw fabric film preparation and stretching and has an excellent balance between film strength and permeability, and uses of the polypropylene.

BACKGROUND ART

Microporous films formed from polymer materials have been used for various purposes, for example, medical or industrial filtration membranes or separation membranes and separators such as battery separators and condenser separators.

In recent years, as a demand for secondary batteries as one power source for cellular phones, mobile computers and automobiles has increased, and a demand for battery separators has increased. With the spread of the separators in automobile batteries among them, densification of energy has been required, and ensuring of safety of batteries has been needed more and more. In order to ensure safety, it is essential for a separator to have shutdown function, but if the temperature further rises after shutdown to thereby melt the whole of the separator and to cause film breakage, electrical insulation cannot be maintained. On this account, improvement in heat resistance of separators has been desired. However, the melting point of ultrahigh-molecular weight polyethylene that is a main material of separators is as low as about 140° C., and the heat resistance is limited. Then, polypropylene having a high melting point has been used for microporous films of high heat resistance. For microporous films, piercing strength to prevent damage done when the film strength is low and external force is applied is generally also desired.

As production processes for microporous films of polypropylene, there are a wet process and a dry process. The wet process is a process comprising forming a film from a resin composition obtained by blending polypropylene with a filler and a plasticizer and extracting the filler and the plasticizer from the film to produce a microporous film. This process has not only a working environmental problem in the extraction step and an environmental problem such as disposal of an extraction liquid but also a possibility of remaining of small amounts of the filler, the plasticizer and the extraction liquid in the microporous film, so that there are fears for performance and safety of a battery. On the other hand, the dry process is a process comprising preparing a raw fabric film of polypropylene and then subjecting the film to cold stretching and hot stretching to form micropores in the film. Since this process does not use a filler, a plasticizer and an extraction liquid at all, such a working environmental problem and such an environmental problem of disposal of the extraction liquid as above do not exist. Further, since a filler, a plasticizer and an extraction liquid are not used, this process is a production process of low cost. Furthermore, there is no possibility of remaining of small amounts of a filler, etc. in the separator, and performance and safety of the battery are not impaired. However, the dry process is a production process in which micropores are formed by stretching, so that permeability and strength of the microporous film are greatly influenced by the properties of polypropylene and the film-forming and stretching conditions. On this account, problems of the microporous film are a narrow range of conditions for forming the microporous film, processing stability and quality stability of the film.

In a patent literature 1, a porous film for a battery separator, which has a high porosity, a large maximum pore diameter and a high permeability and has excellent lithium ion conduction property, and a production process for the film have been disclosed. However, since this porous film has a high molecular weight, the discharge quantity in the raw fabric film production is small, and the productivity is poor.

In a patent literature 2, a fine porous membrane of highly crystalline polypropylene, which has a uniform pore size distribution, a high pore density and a high porosity, has been disclosed. However, improvement in the ranges of membrane-forming conditions and stretching conditions for the fine porous membrane has not been studied at all.

In a patent literature 3, a microporous membrane-forming propylene polymer having excellent heat resistance and strength has been disclosed. However, the microporous film has poor permeability. In a patent literature 4, a microporous film obtained by the use of a polypropylene resin composition having a specific elongational viscosity and a specific shear viscosity has been disclosed, and a film having an excellent permeability has been disclosed. However, polypropylene having an excellent balance between film strength and permeability has not been studied at all.

In patent literatures 5, 6 and 7, a microporous film having excellent lithium ion permeability has been proposed, but a film having an excellent balance between film strength and permeability has not been studied at all, similarly to the patent literature 4.

Also in patent literatures 8, 9, 10 and 11, a microporous film having excellent lithium ion permeability has been proposed. Further, film strength has been also referred to, but there is merely description of tensile yield strength in the Example. In general, the tensile yield strength is a stress measured when the film is in the non-broken state, and it is well known that this has no relation to breaking strength of a film, such as piercing strength. Therefore, improvement in breaking strength of the porous film has not been substantially studied at all. Moreover, the range of the molding conditions for the microporous film is not studied either.

CITATION LIST

Patent Literature

Patent literature 1: Japanese patent Laid-Open Publication No. 1999-297297
Patent literature 2: Japanese Translation of PCT international Application Publication No. 2003-519723
Patent literature 3: Japanese patent Laid-Open Publication No. 2011-256278
Patent literature 4: Japanese patent Laid-Open Publication No. 2011-256316
Patent literature 5: Japanese patent Laid-Open Publication No. 2011-246658
Patent literature 6: Japanese patent Laid-Open Publication No. 2011-246659
Patent literature 7: Japanese patent Laid-Open Publication No. 2012-064556
Patent literature 8: Japanese patent Laid-Open Publication No. 2011-246660
Patent literature 9: Japanese patent Laid-Open Publication No. 2012-092286

Patent literature 10: Japanese patent Laid-Open Publication No. 2012-092287

Patent literature 11: Japanese patent Laid-Open Publication No. 2012-092288

SUMMARY OF INVENTION

Technical Problem

It is an object of the present invention to provide polypropylene for a microporous film which has wide-ranged condition of raw fabric film preparation and raw fabric film stretching and has an excellent balance between film strength and permeability, and uses of the polypropylene.

Solution to Problem

The present invention relates to the following [1] to [14].

[1] Polypropylene for a microporous film, satisfying the following requirements (1) and (2):

(1) the weight-average molecular weight (Mw) value, as determined by gel permeation chromatography (GPC), is not less than 100,000 but less than 800,000, the value (Mw/Mn) obtained by dividing the weight-average molecular weight by the number-average molecular weight is more than 7.0 but not more than 12.0, and the value (Mz/Mw) obtained by dividing the Z-average molecular weight by the weight-average molecular weight is not less than 3.8 but not more than 9.0, and (2) the mesopentad fraction, as measured by $^{13}$C-NMR (nuclear magnetic resonance method), is not less than 95.5%.

[2] The polypropylene for a microporous film as stated in the above [1], which satisfies the following requirement (3):

(3) the Cl content is not more than 5.0 ppm.

[3] The polypropylene for a microporous film as stated in the above [1] or [2], which satisfies the following requirement (4):

(4) the amount of a xylene-soluble portion (CXS) at 23° C. is not more than 5.0%.

[4] The polypropylene for a microporous film as stated in any one of [1] to [3], which contains polypropylene having a molecular weight of not less than 7,000,000 in an amount of not less than 0.3% but not more than 1.5%.

[5] A microporous film comprising the polypropylene for a microporous film as stated in any one of the above [1] to [4].

[6] A separator comprising the polypropylene for a microporous film as stated in any one of the above [1] to [4].

[7] A filtration film comprising the polypropylene for a microporous film as stated in any one of the above [1] to [4].

[8] A separation membrane comprising the polypropylene for a microporous film as stated in any one of the above [1] to [4].

[9] A separator used in a battery comprising the polypropylene for a microporous film as stated in any one of the above [1] to [4].

[10] A separator used in a condenser comprising the polypropylene for a microporous film as stated in any one of the above [1] to [4].

[11] The separator as stated in the above [9], which is used in a lithium ion secondary battery.

[12] The filtration film as stated in the above [7], which is used for medical purposes.

[13] The separation membrane as stated in the above [8], which is used for medical purposes.

[14] A process for producing a microporous film, comprising preparing a raw fabric film of the polypropylene for a microporous film as stated in any one of the above [1] to [4], carrying out a cold stretching step of stretching the thus prepared raw fabric film at a temperature of not lower than 0° C. but lower than 100° C. and than carrying out a hot stretching step of stretching the thus cold-stretched film at a temperature of not lower than 100° C. but lower than 170° C.

Advantageous Effects of Invention

The polypropylene for a microporous film of the present invention contains an ultrahigh-molecular weight component while having an appropriate molecular weight distribution, and has high regularity. Therefore, by the use of this polypropylene as a raw material, a raw fabric film which has highly controlled crystal structure (orientation and crystal size), has few defects such as fish eyes and granules and is excellent in thickness accuracy is obtained. Further, when the raw fabric film is stretched in the next stretching step, a large number of micropores are efficiently formed, and therefore, a microporous film having a wide-ranged stretching conditions and having excellent permeability and film strength is obtained.

DESCRIPTION OF EMBODIMENTS

The polypropylene for a microporous film of the present invention (also referred to as "polypropylene of the present invention" hereinafter) is specifically described hereinafter.

[Microporous Film]

A microporous film indicates a polymer membrane having a large number of micropores of about 0.03 to 2.0 μm, and in the present invention, a membrane having a Gurley permeability, as measured in accordance with JIS P8117, of 100 to 1000 is defined as a microporous film.

[Polypropylene for Microporous Film]

The polypropylene of the present invention satisfies the following requirements (1) and (2).

(1) The weight-average molecular weight (Mw) value, as determined by gel permeation chromatography (GPC), is not less than 100,000 but less than 800,000, the value (Mw/Mn) obtained by dividing the weight-average molecular weight by the number-average molecular weight is more than 7.0 but not more than 12.0, and the value (Mz/Mw) obtained by dividing the Z-average molecular weight by the weight-average molecular weight is not less than 3.8 but not more than 9.0.

(2) The mesopentad fraction, as measured by $^{13}$C-NMR (nuclear magnetic resonance method), is not less than 95.5%.

The polypropylene of the present invention preferably further satisfies the following requirement (3).

(3) The Cl content is not more than 5.0 ppm.

The polypropylene of the present invention preferably furthermore satisfies the following requirement (4).

(4) The amount of a xylene-soluble portion (CXS) at 23° C. is not more than 5.0%.

«Requirement (1)»

The Mw value of the polypropylene of the present invention, as determined by gel permeation chromatography (GPC), is not less than 100,000 but less than 800,000, preferably not less than 200,000 but less than 750,000, more preferably more than 500,000 but less than 750,000. If the Mw value is less than the lower limit, the amount of tie molecules (that is, amorphous chains) to connect a lamella to a lamella is decreased to lower film strength, so that such a value is undesirable. If the Mw value is more than the upper limit, increase in extrusion load such as a rise in resin pressure or motor load takes place, so that such a value is undesirable. Moreover, because of lowering of flow property of the resin, uneven melting, streak or the like is brought about, and the thickness accuracy of the raw fabric film is lowered, whereby it becomes difficult to prepare a raw fabric film suitable for stretching in the next step, so that such a value is undesirable.

The Mw/Mn of the polypropylene of the present invention, as determined by gel permeation chromatography (GPC), is more than 7.0 but not more than 12.0, preferably more than 7.0 but not more than 11.5, more preferably more than 7.0 but not more than 11.0. When the Mw/Mn value is in the above range, the balance between extrusion property or film-forming property and strength is improved because of presence of a low-molecular weight component and a high-molecular weight component, so that such a range is preferable. If the Mw/Mn is less than the lower limit, the low-molecular weight component is reduced, and with increase in the resin viscosity, extrusion load of the molten resin is increased, so that such a value is undesirable. In addition, the resin pressure at the exit of the die is increased to bring about surface roughness or streak of a molten film, whereby the thickness accuracy of the raw fabric film is lowered, and uniform stretching cannot be carried out in the next stretching step, so that such a value is undesirable. If the Mw/Mn exceeds the upper limit, the low molecular weight component is reduced, whereby failure in energy transmission, a cause of which is thought to be an increase in slip between the molten resin and the wall surface in the extrusion zone such as a screw or a cylinder, takes place, and a discharge quantity is decreased or extrusion surging occurs. If the extrusion surging occurs, the raw fabric film has uneven thickness, and the film is ununiformly cooled, so that variation in the molecular orientation of the raw fabric film or in the crystal structure of lamella occurs. On this account, the balance between permeability and strength of the microporous film after the stretching step becomes disrupted, so that such a value is undesirable.

The Mz/Mw of the polypropylene of the present invention, as determined by gel permeation chromatography (GPC), is not less than 3.8 but not more than 9.0, preferably not less than 3.8 but not more than 8.0, more preferably not less than 3.8 but not more than 7.0. In general, Mz/Mw is used as an index of the amount of an ultrahigh-molecular weight component. If the Mz/Mw is less than the lower limit, the ultrahigh-molecular weight component is light, and therefore, the molecular orientation of the raw fabric film is markedly lowered. On that account, the probability of connection of micropores in the thickness direction of the microporous film in the subsequent stretching step is lowered to deteriorate permeability, so that such a value is undesirable. If the Mz/Mw exceeds the upper limit, the ultrahigh-molecular weight component is not homogeneously mixed, and in the preparation of a raw fabric film, uneven flow of the molten resin takes place to thereby bring about uneven molecular orientation, and hence, ununiform micropores are formed in the stretching step.

Since the Mz/Mw of the polypropylene of the present invention is not less than 3.8, the ranges of raw fabric film preparation conditions and stretching conditions for producing a microporous film are extremely widened, and the balance between permeability and strength is remarkably improved. The reason is thought to be that the relaxation time of the ultrahigh-molecular weight component is long, the temperature dependence thereof is small, and the ultrahigh-molecular weight component is homogeneously dispersed in the raw fabric film, and therefore, even if the resin temperature, the stretching temperature and the stretch ratio are changed in the stretching step, uniform micropores tend to be formed, so that through-holes are effectively formed in the stretching step. In general, the relaxation time is proportional to 3.4th power of the molecular weight. Therefore, as the molecular weight of the ultrahigh-molecular weight component increases, the effect of molecular orientation becomes higher even in a small amount, or if the content thereof is small, the influence on Mw and Mw/Mn is extremely small, so that problems of increase in extrusion load, uneven melting, etc. do not occur in the formation of a raw fabric film.

On the other hand, the ultrahigh-molecular weight component is hardly mixed with polypropylene of a low molecular weight, and if the ultrahigh-molecular weight component is directly blended with it, a problem of formation of gel in the raw fabric film occurs, and uniform micropores are not formed. Therefore, it is preferable to produce the polypropylene by carrying out polymerization using the later-described catalyst.

If the molecular weight of the ultrahigh-molecular weight component is less than 7,000,000 or thereabouts, the above effect is low. The polypropylene of the present invention desirably contains an ultrahigh-molecular weight component having a molecular weight of not less than 7,000,000 in an amount of not less than 0.3% but not more than 1.5%, preferably not less than 0.3% but not more than 1.3%, still more preferably not less than 0.3% but not more than 1.0%. If the amount thereof is less than the lower limit, the range of the molding conditions is not widened, and if the amount thereof exceeds the upper limit of the above range, Mw and Mw/Mn are also increased, and problems of increase in extrusion load, uneven melting, etc. occur in the formation of a raw fabric film, so that such values are undesirable.

The polypropylene having Mw in the above range is preferably produced by polymerization, and it can be produced by controlling the Mw value by the amount of hydrogen fed to a polymerization tank during the polymerization of propylene using, for example, the later-described publicly known catalyst. The polypropylene having Mz/Mw and Mw/Mn in the above ranges can be produced by selecting the later-described publicly known catalyst, controlling the polymerization reactions such as a polymerization temperature, and if necessary, controlling a molecular weight of each component and polymerization quantity ratio of the components by multistep polymerization. If Mw, Mz/Mn and Mw/Mn of the polypropylene exceed the upper limits, a peroxide is added in the melt kneading process to decompose the polypropylene, whereby polypropylene having them in the above ranges can be also produced. It is possible that pellets or a powder of polypropylene is blended to adjust those values, but granules due to poor dispersing, such as fish eye, occurs in the raw fabric film, and uneven stretching occurs in the subsequent stretching step. Therefore, the balance between permeability and strength of the microporous film becomes disrupted. Further, in that manner pinholes are also formed in the microporous film, and therefore, when the microporous film is used in a battery separator, there is a risk of short circuit.

《Requirement (2)》

The mesopentad fraction of the polypropylene of the present invention, as measured by $^{13}$C-NMR (nuclear magnetic resonance method), is not less than 95.5%, preferably not less than 95.5% but not more than 99.5%, more preferably not less than 95.5% but not more than 99.0%. When the mesopentad fraction is in the above range, crystallinity of the raw fabric film is increased, and in the stretching step, lamellas are not deformed but an amorphous substance only is deformed. Therefore, micropores are efficiently formed, and excellent permeability is obtained, so that such a range is preferable. On the other hand, if the mesopentad fraction is less than the lower limit, lamellas are liable to be deformed in the stretching step because of lowering of crystallinity and crystal size, and permeability of the microporous film is sometimes lowered, so that such a value is undesirable.

The mesopentad fraction (mmmm fraction) indicates a ratio of presence of pentad isotactic structure in a molecular chain and is a fraction of propylene structure units each of which is present at the center of a chain in which continuous five propylene monomer units each have a meso structure. The polypropylene satisfying such a requirement can be obtained by polymerizing propylene using, for example, the later-described publicly known olefin polymerization catalyst containing a solid titanium catalyst component, an organometallic compound catalyst component and an electron donor that is used when needed.

The polypropylene having an mmmm fraction in the above range can be produced by appropriately selecting the later-described publicly known catalyst. Since the polypropylene of the present invention satisfies the above requirements (1) and (2), favorable extrusion property of a molten resin is obtained in the preparation of a raw fabric film, and a raw fabric film having fewer fish eyes, gels, streaks and melting unevenness and having excellent thickness accuracy is obtained. Moreover, raw fabric film preparation conditions and stretching conditions for producing a microporous film are wide-ranged, and a microporous film having an excellent balance between film strength and permeability can be obtained.

《Requirement (3)》

The polypropylene of the present invention preferably satisfies the following requirement (3).

(3) The Cl content is not more than 5.0 ppm, preferably not more than 4.5 ppm, more preferably not more than 4.0 ppm. When the Cl content is in the above range, deterioration of the resin can be inhibited, so that such a content is preferable. The polypropylene having a Cl content in the above range can be produced by appropriately selecting the later-described publicly known catalyst. On the other hand, if the Cl content exceeds the upper limit, deterioration of the resin is sometimes accelerated, so that such a content is undesirable.

《Requirement (4)》

The polypropylene of the present invention preferably satisfies the following requirement (4).

(4) The amount of a xylene-soluble portion (CXS) at 23° C. is not more than 5.0%. The xylene-soluble component at 23° C. is mainly a component having a low molecular weight and low stereoregularity, and mainly contains a rubber-like component having tackiness. When the amount of such a component is not more than 5%, the amount of a tacky component is small, and therefore, the resulting microporous films exhibit good blocking properties to each other. Moreover, when the polypropylene of the present invention is used for a filtration film, a separation membrane or a separator, such an amount is preferable also from the viewpoint that an effect that a component eluted from the resulting microporous film into a substance in contact with the film or a component that comes into contact with the contents and stains them is reduced is obtained.

On the other hand, the influence of the CXS value on the crystal structure of the raw fabric film is as follows. When the amount of CXC is in the above range, shortage of strength of crystals due to insufficient molecular packing of the crystals rarely occurs, and therefore, micropore blockage due to disintegration of crystals in the stretching step rarely occurs. The polypropylene having the amount of CXS in the above range can be produced by appropriately selecting the later-described publicly known catalyst.

《Requirement (5)》

The polypropylene of the present invention preferably further satisfies the following requirement (5).

(5) The melting point, as determined by DSC measurement, is not lower than 160° C. but not higher than 170° C. When the melting point is in the above range, heat resistance that is not obtained by polyethylene can be imparted to the resulting microporous film, so that such a range is preferable. The polypropylene having a melting point in the above range can be produced by appropriately selecting the later-described publicly known catalyst.

The polypropylene of the present invention satisfying the above requirements (1) and (2) at the same time, preferably further satisfying the above requirements (3) and (4) and more preferably furthermore satisfying the above requirement (5) is preferably produced by the use of the following olefin polymerization catalyst.

[Production Process for Polypropylene for Microporous Film]

The production process for polypropylene for a microporous film is described hereinafter. The polypropylene of the present invention may be a propylene homopolymer or a propylene/α-olefin copolymer (random polypropylene), but it is preferably a propylene homopolymer.

The production process for polypropylene of the present invention is not restricted at all as long as the polypropylene satisfies the requirements (1) and (2) and preferably further satisfies the requirements (3) and (4), but in usual, a process in which propylene is polymerized in the presence of an olefin polymerization catalyst containing a solid titanium catalyst component is preferably used. The said catalyst is, for example, a catalyst containing (I) a solid titanium catalyst component containing magnesium, titanium, halogen and an electron donor, (II) an organometallic compound catalyst component, (III) an electron donor such as a specific polyether compound and an organosilicon compound, e.g. alkoxysilane.

The solid titanium catalyst component (I) can be prepared by bringing a magnesium compound (a-1), a titanium compound (a-2) and an electron donor (a-3) into contact with one another. Examples of the magnesium compounds (a-1) include magnesium compounds having reducing ability, such as a magnesium compound having a magnesium-carbon bond or a magnesium-hydrogen bond, and magnesium compounds having no reducing ability, such as magnesium halide, alkoxymagnesium halide, allyloxymagnesium halide, alkoxymagnesium, allyloxymagnesium and carboxylate of magnesium.

In the preparation of the solid titanium catalyst component (I), it is preferable to use, for example, a tetravalent titanium compound represented by the following formula (3) as the titanium compound (a-2).

$$Ti(OR^6)_g X^1_{4-g} \quad (3)$$

In the formula (3), $R^6$ is a hydrocarbon group, $X^1$ is a halogen atom, and $0 \leq g \leq 4$.

Specifically, there can be mentioned titanium tetrahalides, such as $TiCl_4$, $TiBr_4$ and $TiI_4$; alkoxytitanium trihalides, such as Ti(OCH$_3$)Cl$_3$, Ti(OC$_2$H$_5$)Cl$_3$, Ti(O-n-C$_4$H$_9$)Cl$_3$, Ti(OC$_2$H$_5$)Br$_3$, Ti(O-iso-C$_4$H$_9$)Br; dialkoxytitanium dihalides, such as Ti(OCH$_3$)$_2$Cl$_2$, Ti(OC$_2$H$_5$)Cl$_2$, Ti(O-n-C$_4$H$_9$)$_2$Cl$_2$ and Ti(OC$_2$H$_5$)$_2$Br$_2$; trialkoxytitanium monohalides, such as Ti(OCH$_3$)$_3$Cl, Ti(OC$_2$H$_5$)$_3$Cl, Ti(O-n-C$_4$H$_9$)$_3$Cl and Ti(OC$_2$H$_5$)$_3$Br; and tetraalkoxytitaniums, such as Ti(OCH$_3$)$_4$, Ti(OC$_2$H$_5$)$_4$, Ti(O-n-C$_4$H$_9$)$_4$, Ti(O-iso-C$_4$H$_9$)$_4$ and Ti(O-2-ethylhexyl)$_4$.

Examples of the electron donors (a-3) for use in the preparation of the solid titanium catalyst component (I) include alcohols, phenols, ketones, aldehydes, esters of organic acids or inorganic acids, organic acid halides, ethers (preferred example: the aforesaid polyether), acid amides, acid anhydrides, ammonias, amines, nitriles, isocyanates, nitrogen-containing cyclic compounds and oxygen-containing cyclic compounds. Of these, aromatic polyester compounds such as phthalic acid ester, aliphatic polyesters such as succinic acid ester having a substituent, the later-described alicyclic polyesters and the aforesaid polyether can be given as preferred examples. These compounds may be used in combination of plural kinds.

As the electron donor (a-3) that is preferably used in the present invention, a cyclic ester compound specified by the following formula (1) can be mentioned. A cyclic ester compound specified by the following formula (2) may be included.

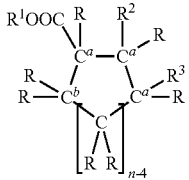

(1)

In the formula (1), n is an integer of 5 to 10. $R^2$ and $R^3$ are each independently COOR' or R, and at least one of $R^2$ and $R^3$ is COOR$^1$. A single bond (other than $C^a$-$C^a$ bond and $C^a$-$C^b$ bond in the case where $R^3$ is R) in the cyclic skeleton may be replaced with a double bond.

Each $R^1$ is independently a monovalent hydrocarbon group of 1 to 20 carbon atoms. Plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, and they may be bonded to each other to form a ring, but at least one R is not a hydrogen atom.

In the skeleton of the ring formed by bonding of plural R to each other, a double bond may be contained, and when two or more $C^a$ to each of which COOR$^1$ is bonded are contained in the skeleton of the ring, the number of carbon atoms to constitute the ring is 5 to 10.

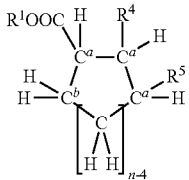

(2)

In the formula (2), n is an integer of 5 to 10.

$R^4$ and $R^5$ are each independently COOR$^1$ or a hydrogen atom, and at least one of $R^4$ and $R^5$ is COOR$^1$. Each $R^1$ is independently a monovalent hydrocarbon group of 1 to 20 carbon atoms. A single bond (other than $C^a$-$C^a$ bond and $C^a$-$C^b$ bond in the case where $R^5$ is R) in the cyclic skeleton may be replaced with a double bond.

In the formula (1), all of bonds between carbon atoms in the cyclic skeleton are preferably single bonds. Of the cyclic ester compounds represented by the formula (1), particularly preferable are diisobutyl 3,6-dimethylcyclohexane-1,2-dicarboxylate, di-n-hexyl 3,6-dimethylcyclohexane-1,2-dicarboxylate, di-n-octyl 3,6-dimethylcyclohexane-1,2-dicarboxylate, diisobutyl 3-methyl-6-ethylcyclohexane-1,2-dicarboxylate, di-n-hexyl 3-methyl-6-ethylcyclohexane-1,2-dicarboxylate, di-n-octyl 3-methyl-6-ethylcyclohexane-1,2-dicarboxylate, diisobutyl 3-methyl-6-n-propylcyclohexane-1,2-dicarboxylate, di-n-hexyl 3-methyl-6-n-propylcyclohexane-1,2-dicarboxylate, di-n-octyl 3-methyl-6-n-propylcyclohexane-1,2-dicarboxylate, diisobutyl 3,6-diethylcyclohexane-1,2-dicarboxylate, di-n-hexyl 3,6-diethylcyclohexane-1,2-dicarboxylate and di-n-octyl 3,6-diethylcyclohexane-1,2-dicarboxylate.

Of the compounds represented by the formula (2), particularly preferable are diisobutyl cyclohexane-1,2-dicarboxylate, dihexyl cyclohexane-1,2-dicarboxylate, diheptyl cyclohexane-1,2-dicarboxylate, dioctyl cyclohexane-1,2-dicarboxylate and di-2-ethylhexyl cyclohexane-1,2-dicarboxylate.

When such a magnesium compound (a-1), such a titanium compound (a-2) and such an electron donor (a-3) as above are brought into contact with one another, other reaction reagent, such as silicon, phosphorus or aluminum, may coexist, or by the use of a carrier, a carrier-supported type solid titanium catalyst component (I) can be also prepared.

The solid titanium catalyst component (I) can be prepared by adopting any of processes including publicly known processes, and some examples are given and briefly described below.

(1) A process wherein a hydrocarbon solution of an adduct of an alcohol or a metallic acid ester and the magnesium compound (a-1) is subjected to catalytic reaction with the titanium compound (a-2) and an organometallic compound to precipitate a solid, and thereafter or with precipitating, the solid is subjected to catalytic reaction with the titanium compound (a-2).

(2) A process wherein a solid adduct of the magnesium compound (a-1) and an alcohol or an ester is subjected to catalytic reaction with the titanium compound (a-2) and an organometallic compound, and thereafter the reaction product is subjected to catalytic reaction with the titanium compound (a-2).

(3) A process wherein a contact product of an inorganic carrier with the organomagnesium compound (a-1) is subjected to catalytic reaction with the titanium compound (a-2) and the electron donor (a-3). In this case, the contact product may be subjected to catalytic reaction in advance with a halogen-containing compound and/or an organometallic compound.

(4) Any one of the above processes including a step that is carried out in the presence of an aromatic halogenated hydrocarbon.

These processes are preferred examples.

The organometallic compound catalyst component (II) is preferably one containing a metal selected from Group 1, Group 2 and Group 13 of the periodic table. Specifically, there can be mentioned such an organoaluminum compound, such a complex alkylated compound of a Group I metal and aluminum and such an organometallic compound of a Group II metal as shown below.

An organoaluminum compound (b-1) represented by the formula:

(wherein $R^7$ and $R^8$ are each a hydrocarbon group usually having 1 to 15 carbon atoms, preferably 1 to 4 carbon atoms and they may be the same as or different from each other. X is a halogen atom, and m, r, p and q are numbers satisfying the conditions of $0<m\leq3$, $0\leq r<3$, $0\leq p<3$, $0\leq q<3$ and $m+r+p+q=3$).

A complex alkylated compound (b-2) of a Group 1 metal and aluminum, which is represented by the formula $M^1AlR^7_4$ (wherein $M^1$ is Li, Na or K, and $R^7$ is the same as above).

A dialkyl compound (b-3) containing a Group 2 or Group 13 element, which is represented by the formula $R^7R^8M^2$ (wherein $R^7$ and $R^8$ are the same as above, and $M^2$ is Mg, Zn or Cd).

Examples of the organoaluminum compounds (b-1) include a compound represented by $R^7_mAl(OR^8)_{3-m}$ ($R^7$ and $R^8$ are the same as above, and m is preferably a number of $1.5\leq m\leq3$), a compound represented by $R^7_mAlX_{3-m}$ ($R^7$ is the same as above, X is a halogen, and m is preferably a number of $0<m<3$), a compound represented by $R^7_mAlH_{3-m}$ ($R^7$ is the same as above, and m is preferably a number of $2\leq m<3$), and a compound represented by $R^7_mAl(OR^8)_nX_q$ ($R^7$ and $R^8$ are the same as above, X is a halogen, $0<m\leq3$, $0\leq n<3$, $0\leq q<3$ and $m+r+q=3$).

The organosilicon compound catalyst component (III) is specifically an organosilicon compound represented by the following formula (4), or the like.

$$SiR^9R^{10}_d(OR^{11})_{3-d} \quad (4)$$

In the formula (4), d is 0, 1 or 2, $R^9$ is a group selected from the group consisting of a cyclopentyl group, a cylohexyl group, a cyclopentenyl group, a cyclopentadienyl group, an alkyl group, a dialkylamino group and derivatives thereof, and $R^{10}$ and $R^{11}$ are each a hydrocarbon group.

Preferred examples of $R^9$ in the formula (4) include bulky substituents, e.g., cyclopentyl groups and derivative thereof, such as cyclopentyl group, 2-methylcyclopentyl group, 3-methylcyclopentyl group, 2-ethylcyclopentyl group, 3-proopylcyclopentyl group, 3-isopropylcyclopentyl group, 3-butylcyclopentyl group, 3-tert-butylcyclopentyl group, 2,2-dimethylcyclopentyl group, 2,3-dimethycyclopentyl group, 2,5-dimethylcyclopentyl group, 2,2,5-trimethylcyclopentyl group, 2,3,4,5-tetramethylcyclopentyl group, 2,2,5,5-tetramethylcyclopentyl group, 1-cyclopentylpropyl group and 1-methyl-1-cyclopentylethyl group; cyclohexyl groups and derivatives thereof, such as cyclohexyl group, 2-methylcyclohexyl group, 3-methylcyclohexyl group, 4-methylcyclohexyl group, 2-ethylcyclohexyl group, 3-ethylcyclohexyl group, 4-ethylcyclohexyl group, 3-propylcyclohexyl group, 3-isopropylcyclohexyl group, 3-butylcyclohexyl group, 3-tert-butylcyclohexyl group, 4-propylcyclohexyl group, 4-isopropylcyclohexyl group, 4-butylcyclohexyl group, 4-tert-butylcyclohexyl group, 2,2-dimethylcyclohexyl group, 2,3-dimethylcyclohexyl group, 2,5-dimethylcyclohexyl group, 2,6-dimethylcyclohexyl group, 2,2,5-trimethylcyclohexyl group, 2,3,4,5-tetramethylcyclohexyl group, 2,2,5,5-tetramethylcyclohexyl group, 2,3,4,5,6-pentamethylcyclohexyl group, 1-cyclohexylpropyl group and 1-methyl-1-cyclohexylethyl group; cyclopentenyl groups and derivatives thereof, such as cyclopentenyl group, 2-cyclopentenyl group, 3-cyclopentenyl group, 2-methyl-1-cyclopentenyl group, 2-methyl-3-cyclopentenyl group, 3-methyl-3-cyclopentenyl group, 2-ethyl-3-cyclopentenyl group, 2,2-dimethyl-3-cyclopentenyl group, 2,5-dimethyl-3-cyclopentenyl group, 2,3,4,5-tetramethyl-3-cyclopentenyl group and 2,2,5,5-tetramethyl-3-cyclopentenyl group; cyclopentadienyl groups and derivatives thereof, such as 1,3-cyclopentadienyl group, 2,4-cyclopentadienyl group, 1,4-cyclopentadienyl group, 2-methyl-1,3-cyclopentadienyl group, 2-methyl-2,4-cyclopentadienyl group, 3-methyl-2,4-cyclopentadienyl group, 2-ethyl-2,4-cyclopentadienyl group, 2,2-dimethyl-2,4-cyclopentadienyl group, 2,3-dimethyl-2,4-cyclopentadienyl group, 2,5-dimethyl-2,4-cyclopentadienyl group and 2,3,4,5-tetramethyl-2,4-cyclopentadienyl group; alkyl groups, such as isopropyl group, tert-butyl group and sec-butyl group; and dialkylamino groups, such as dimethylamino group, diethylamino group and dibutylamino group. More preferable are cyclopentyl group, cyclohexyl group and isopropyl group, and particularly preferable is cyclopentyl group.

Specific examples of the hydrocarbon groups of $R^{10}$ and $R^5$ in the formula (4) include, in addition to the above-mentioned substituents, hydrocarbon groups, such as alkyl groups, cycloalkyl groups, aryl groups and aralkyl groups. When two or more of $R^{10}$ or $R^{11}$ are present, those $R^{10}$ or those $R^{11}$ may be the same or different, and $R^{10}$ and $R^{11}$ may be the same or different. In the formula (4), $R^9$ and $R^{10}$ may be crosslinked by an alkylene group or the like.

Specific examples of the organosilicon compounds represented by the formula (4) include trialkoxysilanes, such as diethylaminotriethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane and cyclohexyltrimethoxysilane; dialkoxysilanes, such as diisopropyldimethoxysilane, tert-butylethyldimethoxysilane, cyclopentyl-tert-butyldimethoxysilane, cyclohexylisobutyldimethoxysilane, bisdiethylaminodimethoxysilane, dicyclopentyldimethoxysilane, bis(2-methylcyclopentyl)dimethoxysilane, bis(3-tert-butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclopentenyldimethoxysialne, di(3-cyclopentenyl)dimethoxysilane, bis(2,5-dimethyl-3-cyclopentenyl)dimethoxysilane, di-2,4-cyclopentadienyldimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, cyclopentadienylindenyldimethoxysilane and dicyclohexyldimethoxysilane; and monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and tricyclohexylmethoxysilane. Of these, diisopropyldimethoxysilane, tert-butylethyldimethoxysilane, cyclopentyl-tert-butyldimethoxysilane, cyclohexylisobutyldimethoxysilane, bisdiethylaminodimethoxysilane, diethylaminotriethoxysilane and dicylopentyldimethoxysilane are preferable because stereoregularity of polypropylene is enhanced, and of these, dicyclopentyldimethoxysilane is particularly preferable. These compounds can be used singly, or can be used in combination of two or more kinds.

Prior to the polymerization of propylene using a catalyst comprising such a solid titanium catalyst component (I), such an organometallic compound catalyst component (II) and such an organosilicon compound catalyst component (III) as above, prepolymerization can be also carried out in advance. In the prepolymerization, an olefin is polymerized in the presence of the solid titanium catalyst component (I), the organometallic compound catalyst component (II), and if necessary, the organosilicon compound catalyst component (III).

As the prepolymerization olefin, for example, an olefin of 2 to 8 carbon atoms can be used. Specifically, straight-chain olefins, such as ethylene, propylene, 1-butene and 1-octene; olefins having a branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene; etc. can be used. These may be copolymerized. For the purpose of enhancing crystallinity of the resulting polypropylene, bulky olefins such as 3-methyl-1-butene and 3-methyl-1-pentene are preferably used in some cases.

It is desirable to carry out the prepolymerization in such a manner that about 0.1 to 1000 g, preferably about 0.3 to 500 g, of a polymer is produced based on 1 g of the solid titanium catalyst component (I). If the prepolymerization quantity is too large, efficiency of production of a polymer in the polymerization is sometimes lowered. In the prepolymerization, the catalyst can be used in a considerably higher concentration than the catalyst concentration in the system in the polymerization.

In the polymerization, the solid titanium catalyst component (I) (or the prepolymerized catalyst) is desirably used in an amount of about 0.0001 to 50 mmol, preferably about 0.001 to 10 mmol, in terms of a titanium atom, based on 1 liter of the polymerization volume. The organometallic compound catalyst component (II) is desirably used in an amount of about 1 to 2000 mol, preferably about 2 to 500 mol, in terms of a metal atom, based on 1 mol of a titanium atom in the polymerization system. The organosilicon compound catalyst component (III) is desirably used in an amount of about 0.001 to 50 mol, preferably about 0.01 to 20 mol, based on 1 mol of a metal atom of the organometallic compound catalyst component (II).

The polymerization may be carried out by any of a gas phase polymerization process and a liquid phase polymerization process such as a solution polymerization process or a suspension polymerization process, and the steps of the polymerization may be carried out by different methods. Further, the polymerization may be carried out by any of a continuous process and a semicontinuous process. By dividing polymerizers into groups of plural polymerizers, e.g., 2 to 10 polymerizers, each step may be carried out using the thus divided polymerizers.

As polymerization media, inert hydrocarbons may be used, or liquid propylene may be used as a polymerization medium. As the polymerization conditions in each step, the polymerization temperature is appropriately selected in the range of about −50 to +200° C., preferably about 20 to 100° C., and the polymerization pressure is appropriately selected in the range of normal pressure to 10 MPa (gauge pressure), preferably about 0.2 to 5 MPa (gauge pressure).

After completion of the polymerization, publicly known post treatment steps, such as catalyst deactivation step, catalyst residue removal step and drying step, are carried out when needed, whereby polypropylene is obtained as a powder. As the solid titanium catalyst components, some of the catalysts disclosed in, for example, Japanese Patent No. 2723137, Japanese Patent No. 2776914, WO 2006/77945, WO 2008/10459, Japanese Patent Laid-Open Publication No. 1992-218507, Japanese Patent No. 2774160, WO 2004/16662, Japanese Patent Laid-Open Publication No. 2011-256278 and Japanese Patent Laid-Open Publication No. 2009-57473, can be also used.

[Additives]

As additives, publicly known antioxidant and neutralizing agent, which can be generally added to a polypropylene resin, are preferably blended with the polypropylene. It is desirable thought that the effective amount of the blended antioxidant may be not less than 500 ppm but less than 8000 ppm, preferably not less than 750 ppm but less than 7500 ppm, based on the polypropylene resin, and on the other hand, the amount of the effective neutralizing agent since the excessive amount leads to defects of the film, such as fish eye and increase in the amount of a tacky component, may be not less than 5 ppm but less than 1000 ppm, preferably not less than 10 ppm but less than 750 ppm, more preferably not less than 15 ppm but less than 500 ppm.

Also as additives other than the antioxidant and the neutralizing agent, publicly known additives, which can be added to a polypropylene resin, can be used within limits not detrimental to the object of the present invention, and for example, a nucleating agent (a crystal nucleating agent such as phosphoric acid ester metallic salt and sorbitol-based compound, or β crystal nucleating agent such as amide-based compound), an ultraviolet absorbing agent, a lubricant, a flame retardant and an antistatic agent can be used.

[Other Components]

In the production of a microporous film from the polypropylene of the present invention, at least one material selected from the group consisting of plasticizers, polyolefins including ethylene-based copolymers, and inorganic powders may be added to the polypropylene to prepare a polypropylene composition.

(Polyolefin Other than Polypropylene)

For the purpose of imparting functions such as shutdown property, an ethylene-based copolymer may be added to the polypropylene of the present invention as long as it is not detrimental to the object of the present invention.

The ethylene-based copolymer is an ethylene-based copolymer having a density of 925 to 970 kg/m$^3$, preferably 930 to 965 kg/m$^3$. The intrinsic viscosity [η] of the ethylene-based copolymer, as measured using a decalin solution of the copolymer, is preferably 2 to 40 dl/g, more preferably 3 to 40 dl/g.

The amount of the ethylene-based copolymer in a polypropylene resin composition containing the polypropylene and the ethylene-based copolymer is usually 1 to 50% by mass, preferably 5 to 40% by mass, though it varies depending upon the properties imparted.

(Plasticizer)

To the polypropylene of the present invention, a plasticizer may be added within limits not detrimental to the object of the present invention.

Examples of the plasticizers include, as solvents that are liquid at room temperature, aliphatic, cyclic aliphatic or aromatic hydrocarbons, such as nonane, decane, decalin, paraxylene and liquid paraffin, and mineral oil fractions whose boiling points correspond to these hydrocarbons, and as solvents that are solid at room temperature, stearyl alcohol and paraffin wax. Of these, the solvents that are liquid at room temperature are preferable, and liquid paraffin is particularly preferable. When a plasticizer is added, the preparation process for a microporous film preferably includes a step of washing a film with a solvent as one step of the process.

(Inorganic Powder)

For the purpose of controlling the shape or the quantity of pores and heat resistance, inorganic powder may be added to the polypropylene of the present invention.

Examples of the inorganic powders include talc, clay, calcium carbonate, mica, silicates, carbonates, glass fiber, carbon fiber, and oxides or nitrides of metals such as silicon, aluminum and titanium. Of these, oxides or nitrides of metals are preferable, and silica powder is particularly preferable. The mean particle diameter of the inorganic powder is desired to be in the range of 0.001 to 10 µm, preferably 0.01 to 5 µm. The inorganic powders can be used singly, or can be used in combination of two or more kinds. The amount of the inorganic powder added is 1 to 80 parts by weight, preferably 10 to 60 parts by weight.

[Preparation Process for Microporous Film]

For preparing a microporous film using the polypropylene of the present invention, various processes publicly known can be used. For example, a process comprising kneading the aforesaid various components by the use of a usual kneading apparatus, such as Henschel Mixer, ribbon blender or Banbury mixer, can be mentioned. With regard to melt kneading and pelletization, the components are melt-kneaded at 170 to 280° C., preferably 190 to 250° C., using a usual single screw or twin-screw extruder, a Bravender or a roll and then pelletized, or without performing pelletization, a raw fabric sheet or a raw fabric film for a microporous film can be directly formed using a hitherto publicly known technique.

Preferred embodiments of preparation of a microporous film using the polypropylene of the present invention are as follows. That is to say, using the polypropylene of the present invention, the following raw fabric film preparation step and stretching steps (cold stretching step and then hot stretching step) are carried out, whereby a microporous film having a better balance between film strength and permeability can be prepared.

(Raw Fabric Film Preparation Step)

In the preparation of a raw fabric film, a general film-forming machine, such as an inflation machine using a cylindrical die, a casting machine using a die (T-die) with a lip of rectangular shape or a sheet-forming machine, can be used. In particular, a casting machine having a T-die or a sheet-forming machine is preferable because monoaxial stretching is easy.

When molding is carried out using a T-die, the extrusion temperature is set to 180 to 250° C., preferably 180 to 240° C., more preferably 190 to 230° C. If the temperature is lower than the lower limit, unmolten granules or uneven melting occurs, and if the temperature exceeds the upper limit, molecular orientation of the raw fabric film is insufficient, so that such temperatures are undesirable. The value (drawdown ratio) obtained by dividing the lip opening of the T-die by the thickness of the raw fabric film is set to not less than 50 but less than 500, preferably not less than 60 but less than 300, more preferably not less than 70 but less than 300. The film thickness of the raw fabric film is set in the range of 10 µm to 50 µm. When the thickness is in this range, orientation of the raw fabric film is particularly enhanced, and in the subsequent stretching step, micropores are formed among lamellas, so that such a range is preferable.

The temperature of a chill roll (chill roll temperature) in the raw fabric film preparation is set to 60° C. to 160° C., preferably 80° C. to 150° C., more preferably 100° C. to 140° C. If the chill roll temperature is set to lower than the lower limit, the raw fabric film is quenched rapidly. As a result, crystallinity and crystal size are decreased, and in the next stretching step, lamellas in the raw fabric film are deformed and micropores are not formed, so that such a temperature is undesirable. If the chill roll temperature exceeds the upper limit, the molten film cannot be sufficiently hardened, and therefore, preparation of a raw fabric film becomes difficult, so that such a temperature is undesirable.

It is preferable to subject the resulting raw fabric film to aging at a temperature of not lower than 80° C. but not higher than 170° C., preferably not lower than 80° C. but not higher than 160° C., more preferably not lower than 80° C. but not higher than 150° C., for not shorter than 5 minutes, preferably not shorter than 30 minutes, more preferably not shorter than 1 hour. By subjecting the raw fabric film to aging under the above conditions, a large number of uniform micropores are formed in the next stretching step, and permeability of the micropores is improved. If the aging temperature is set to lower than the lower limit, crystals are not sufficiently grown during the aging, and the effect of aging is not observed. If the temperature is set to higher than the upper limit, the raw fabric film is sometimes melted. Therefore, such temperatures are undesirable.

Steps of surface treatment, such as corona treatment, flame treatment or ozone treatment, hydrophilic treatment, etc. may be carried out on both surfaces or any one surface of the raw fabric film, when needed. For the purpose of imparting shutdown function, the polypropylene of the present invention may be blended with resins (including the aforesaid polyethylene) having lower melting points than the polypropylene of the present invention, or a multilayer film containing a layer of a resin having a lower melting point may be prepared. For the purpose of imparting further heat resistance, blending with a resin having a higher melting point than the polypropylene of the present invention, such as polyolefin or polyamide, or formation of a multilayer film having a layer of such a resin may be carried out.

(Stretching Step)

To stretching of the raw fabric film, general stretching methods, such as roll stretching, tenter stretching and tubular stretching, can be applied. Although the stretching method is not specifically restricted, monoaxial stretching using a roll stretching method is preferable. The stretching step consists of two steps. First, cold stretching is carried out to form cracks among lamellas, and then, with maintaining the stretch ratio of the cold stretching, hot stretching is carried out to widen the cracks, whereby micropores are formed.

In the cold stretching step, the stretching temperature of the raw fabric film is not lower than 0° C. but lower than 100° C., preferably not lower than 5° C. but lower than 100° C., more preferably not lower than 10° C. but lower than 100° C., and the stretch ratio is not less than 1.05 times but not more than 3.00 times, preferably not less than 1.10 times but not more than 2.50 times, more preferably not less than 1.15 times but not more than 2.50 times, based on the raw fabric film. If the stretching temperature is lower than the lower limit, cracks are not formed among lamellas, and the raw fabric film is sometimes broken, so that such a temperature is undesirable. On the other hand, if the stretching temperature exceeds the upper limit, lamellas are also deformed, and cracks are not formed. If the stretch ratio is less than the lower limit, cracks are not formed, and if the stretch ratio exceeds the upper limit, the raw fabric film is liable to be broken.

In the hot stretching step, the stretching temperature is not lower than 100° C. but lower than 170° C., preferably not lower than 100° C. but lower than 165° C., more preferably not lower than 100° C. but lower than 160° C., and the stretch ratio is not less than 1.05 times but not more than 3.00 times, preferably not less than 1.10 times but not more than 2.50 times, more preferably not less than 1.15 times but not more than 2.50 times, based on the cold-stretched film. If the stretching temperature is lower than the lower limit, micropores are not formed, and through-holes are not effectively formed. If the stretching temperature exceeds the upper limit, crystals are melted, and micropores are not formed. If the stretch ratio is less than the lower limit, micropores are not formed, and if the stretch ratio exceeds upper limit, the raw fabric film is liable to be broken. It is preferable to carry out hot stretching with maintaining the stretch ratio of the cold-stretched film.

For controlling a heat shrinkage ratio of the microporous film, the microporous film after the hot stretching may be subjected to aging, when needed. The aging temperature is not lower than 30° C. but lower than 170° C., preferably not lower than 40° C. but lower than 165° C., more preferably not lower than 50° C. but lower than 160° C., and the fixed ratio of the film during aging is not less than 0.70 time but not more than 1.0 time, preferably not less than 0.75 time but not more than 1.00 time, more preferably not less than 0.80 time but not more than 0.95 time, based on the hot-stretched film. If the aging temperature is lower than the lower limit, the heat shrinkage ratio of the microporous film cannot be controlled, and if the aging temperature exceeds the upper limit, there is a fear that crystals of polypropylene are melted to lower permeability. If the fixed ratio of the film during aging is less than the lower limit, micropores having been formed by stretching are closed, and if the fixed ratio exceeds the upper limit, the heat shrinkage ratio cannot be controlled, so that such temperatures are undesirable.

The film thickness of the microporous film is not less than 10 μm but less than 50 μm, preferably not less than 15 μm but less than 45 μm, more preferably not less than 15 μm but less than 40 μm. If the film thickness is less than the lower limit, strength of the microporous film is lowered, so that such a thickness is undesirable. If the film thickness exceeds the upper limit, formation of through-holes becomes difficult, and therefore, permeability is liable to be lowered.

(Surface Treatment)

Both surfaces or any one surface of the resulting microporous film may be subjected to coating with an inorganic substance for imparting heat resistance or chemical resistance to the micrioporous film or surface treatment using a surface active agent or the like for changing wettability. Further, the resulting microporous film may be made to have a multilayer structure having a layer of, for example, a resin (including ethylene-based polymer) having a lower melting point than the polypropylene of the present invention for the purpose of imparting shutdown function, or a multilayer structure having a layer of a resin having a higher melting point than the polypropylene of the present invention for the purpose of imparting further heat resistance.

(Formation of Multilayer Microporous Film)

The polypropylene of the present invention may be subjected to co-extrusion together with polyethylene or low-melting point polypropylene. For example, for the purpose of imparting shutdown function, a method for preparing a multilayer raw fabric film having a three-layer structure of polypropylene (PP) of the present invention/(polyethylene (PE) or low-melting point polypropylene (PP))/PP of the present invention, or (PE of low-melting point PP)/PP of the present invention/(PE or low-melting point PP) can be used. Furthermore, a method comprising preparing microporous films using the polypropylene of the present invention, polyethylene and low-melting point polypropylene, respectively, and laminating them together may be used.

Moreover, for the purpose of imparting heat resistance, the microporous film may be made to have a multilayer structure by a method comprising preparing a microporous film using a heat-resistant resin such as aramid resin and laminating the film onto the microporous film having been prepared from the polypropylene of the present invention to form a multilayer structure.

[Uses]

The polypropylene of the present invention is preferably used for at least one kind selected from the group consisting of a microporous film, a separator, a filtration film and a separation membrane.

The separator is more preferably a separator for a battery or a separator for a condenser, and the separator for a battery is particularly preferably a separator for a lithium ion secondary battery. The filtration film is more preferably a filtration film for medical purposes, and the separation membrane is more preferably a separation membrane for medical purposes.

EXAMPLES

The present invention is more specifically described below with reference to the following examples, but it should be construed that the present invention is in no way limited to those examples. Measuring methods for properties in the examples and the comparative examples are as follows.

[Molecular Weight, Molecular Weight Distribution]

Liquid chromatograph: Waters ALC/GPC150-Cplus type (differential refractometer detector integral type);

column: two of Tosoh GMH6-HT and two of Tosoh GMH6-HTL were connected in series.

Mobile phase medium: o-dichlorobenzene

Flow rate: 1.0 mL/min

Measuring temperature: 140° C.

Preparation method for calibration curve: standard polystyrene sample was used.

Sample concentration: 0.10% (W/W)

Amount of sample solution: 500 μl

Measurement was carried out under the above conditions, and the resulting chromatogram was analyzed by a publicly known method, whereby Mw value, Mw/Mn value and Mz/Mw value of the polypropylene of the present invention were calculated. Calculation of a molecular weight was made by a universal calibration method, and a value in terms of polystyrene was calculated. With regard to the baseline of the GPC chromatogram, a retention time for rise of the elution curve was regarded as a starting point, and a retention time corresponding to a molecular weight of 1000 was regarded as an end point.

[Amount of Ultrahigh-Molecular Weight Component (%)]

From the chromatogram obtained in the molecular weight measurement, a ratio occupied by peaks of a component having a molecular weight of not less than 7,000,000 in all peaks was calculated from the following formula.

(Peak intensity of component having molecular weight of not less than 7,000,000)÷(peak intensity of the whole)×100

[Mesopentad Fraction]

The mesopentad fraction [mmmm] is a value determined by the assignment shown in A. Zambelli, et al., *Macromolecules* 8, 687 (1975), and the measurement was carried out by $^{13}$C-NMR under the following conditions to determine a mesopentad fraction=(peak area at 21.7 ppm)/(peak area at 19 to 23 ppm).

Type: JNM-Lambada 400 (manufactured by JEOL Ltd.)
Resolution: 400 MHz
Measuring temperature: 125° C.
Solvent: 1,2,4-trichlorobenzene/deuterated benzene=7/4
Pulse width: 7.8 μsec (45° pulse)
Pulse interval: 5 sec
Cumulative number of times: 2000
Shift reference: TMS=0 ppm
Mode: single pulse broadband decoupling

[Cl Content]

0.8 g of a polypropylene resin was combusted at 400 to 900° C. in an argon/oxygen stream by the use of a combustion equipment manufactured by Mitsubishi Chemical Industries, Ltd., then a combustion gas was captured by ultrapure water, and a Cl content in a sample solution after concentration was measured using a DIONEX-DX300 type ion chromatography instrument manufactured by Nippon Dionex Co., Ltd. and using an anion column AS4A-SC (manufactured by Nippon Dionex Co., Ltd.).

[Amount of Xylene-Soluble Portion at 23° C. (CXS)]

5 g of a polypropylene-based resin sample weighed was completely dissolved in 500 mL of boiling xylene, and thereafter, the solution was allowed to stand still until the liquid temperature became 20° C. After the liquid temperature became 20° C., the solution was further allowed to stand still for 30 minutes, and thereafter, the precipitate was filtered. The filtrate was concentrated and evaporated to dryness and then further dried at 60° C. and 160 mmHg for 6 hours, and the residue was weighed. A ratio of the weight of the xylene eluted substance to the weight of the sample used was calculated as CXS.

[Melt Flow Rate]

Melt flow rate (MFR) was measured under the conditions of 230° C. and a load of 2.16 kg in accordance with JIS K7210.

[Evaluation of Microporous Film]

(Molding Condition Range)

Using the molding conditions described in the later-described "(5) Production of microporous film", molding was carried out at a resin temperature at the T-die in the raw fabric film formation, at a stretching temperature in the hot stretching step and in a stretch ratio within the range of about ±15%. Specifically, setting of the molding conditions was changed so that the resin temperature at the T-die might be 190° C., 210° C. or 240° C., the stretching temperature might be 110 to 150° C. (every 5° C.), and the stretch ratio might be 1.2 to 1.7 times (every 0.1 time). Superiority or inferiority was judged as follows.

◎: A case where a microporous film exhibiting permeability was obtained in the whole range of the above molding conditions.

Δ: A case where a microporous film having no permeability was obtained in a part of the above molding condition range.

x: A case where a microporous film exhibiting permeability was not obtained in the whole range of the above molding conditions.

(Gurley Permeability (Sec/100 mL))

Gurley permeability was measured in accordance with JIS P8117. As a measuring instrument, a B type Gurley densometer (manufactured by Toyo Seiki Seisaku-sho, Ltd.) was used. The test temperature was 23° C., the humidity was 50% RH, and the sample area was 645 mm$^2$. A cylinder weight was 567 g. Air in the cylinder was passed from a test hole portion to the outside of the cylinder. A period of time required for passing of 100 cc of air was measured, and it was taken as a permeability.

(Piercing Strength (N))

A maximum load given when a needle having a diameter of 1 mm and a radius of 0.5 mm was allowed to pierce the film at 2 mm/sec was measured, and the resulting value was converted to a value in a thickness of 25 mm. The measuring conditions are described below.

Tester: Strograph V10-D manufactured by Toyo Seiki Seisaku-sho, Ltd.
Test rate: 120 mm/min
Tip: 1.00 mmφ, 0.5 mm
Receiver: 30.0 mmφ (holder)

Example 1

(1) Production of Solid Catalyst

After a high-speed stirring apparatus having an internal volume of 2 liters (manufactured by Tokushu Kika Kogyo Co., Ltd. (TK homomixer M type)) was thoroughly purged with nitrogen, 700 mL of purified decane, 10 g of commercially available magnesium chloride, 24.2 g of ethanol and 3 g of Reodol SP-S20 (trade name, sorbitan distearate manufactured by Kao Corporation) were placed in this apparatus, then with stirring this suspension, the reaction system was heated, and the suspension was stirred at 800 rpm for 30 minutes at 120° C. Subsequently, with stirring this suspension at a high speed so that a precipitate should not be formed, the suspension was transferred into a 2-liter glass flask (equipped with stirrer) containing 1 liter of purified decane having been cooled to −10° C. in advance, by the use of a Teflon (registered trademark) tube having an inner diameter of 5 mm. A solid adduct having been formed by the liquid transfer was filtered and sufficiently washed with purified n-heptane to obtain a solid adduct to which 2.8 mol of ethanol had been coordinated based on 1 mol of magnesium chloride.

This solid adduct was suspended in decane, and in 100 mL of titanium tetrachloride maintained at −20° C., 23 mmol (in terms of magnesium atom) of the solid adduct was introduced with stirring to obtain a mixed liquid. This mixed liquid was heated to 80° C. over a period of 5 hours, and when a temperature of 80° C. was reached, diisobutyl 3,6-dimethylcyclohexane-1,2-dicarboxylate (mixture of cis isomer and trans isomer) was added in an amount of 0.085 mol based on 1 mol of a magnesium atom of the solid adduct, and the temperature was raised up to 110° C. over a period of 40 minutes. When a temperature of 110° C. was reached, diisobutyl cyclohexane-1,2-dicarbxylate (mixture of cis isomer and trans isomer) was added in an amount of 0.0625 mol based on 1 mol of a magnesium atom of the solid adduct, and the temperature was maintained at 110° C. for 90 minutes with stirring to allow them to react with each other.

After completion of the reaction for 90 minutes, a solid was collected by hot filtration, and the solid was resuspended in 100 mL of titanium tetrachloride and then heated. When a temperature of 110° C. was reached, the temperature was maintained for 45 minutes with stirring to allow them to react with each other. After completion of the reaction for 45 minutes, a solid was collected by hot filtration again, and the solid was sufficiently washed with decane at 100° C. and heptane until a titanium compound liberated in the wash liquid came to be not detected.

The solid titanium catalyst component (α-1) prepared through the above operations was stored as a decane suspension, and a part of it was dried for the purpose of examining catalytic composition. The solid titanium catalyst component (α-1) obtained as above had composition of 3.2% by mass of titanium, 17% by mass of magnesium, 57% by mass of chlorine, 10.6% by mass of diisobutyl 3,6-dimethylcyclohexane-1,2-dicarboxylate, 8.9% by mass of diisobutyl cyclohexane-1,2-dicarboxylate and 0.6% by mass of an ethyl alcohol residue.

(2) Production of Prepolymerized Catalyst

In an autoclave having an internal volume of 200 liters and equipped with a stirrer, 150 g of the solid catalyst component prepared in the above (1), 74.4 mL of triethylaluminum and 75 liters of heptane were introduced, then with maintaining the internal temperature at 10 to 18° C., 900 g of propylene was introduced, and reaction was carried out for 60 minutes with stirring. The resulting prepolymerized catalyst contained 6 g of polypropylene based on 1 g of the transition metal catalyst component.

(3) Polymerization

To a polymerization vessel having an internal volume of 1000 liters and equipped with a stirrer were continuously fed propylene at 139 kg/hr, the catalyst slurry at 1.6 g/hr as the transition metal catalyst component, triethylauminum at 10.7 mL/hr and dicyclopentyldimethoxysilane at 18.3 mL/hr, and hydrogen was fed so that the hydrogen concentration in the gas phase portion might become 4.5% by mol. Polymerization was carried out at a polymerization temperature of 70° C. and a pressure of 3.0 MPa/G.

The resulting slurry was sent to a polymerization vessel having an internal volume of 500 liters and equipped with a stirrer, and polymerization was further carried out. To the polymerization vessel, propylene was fed at 34 kg/hr, and hydrogen was fed so that the hydrogen concentration in the gas phase portion might become 3.5% by mol. The polymerization was carried out at a polymerization temperature of 67° C. and a pressure of 3.0 MPa/G.

The resulting slurry was sent to a polymerization vessel having an internal volume of 500 liters and equipped with a stirrer, and polymerization was further carried out. To the polymerization vessel, propylene was fed at 13 kg/hr, and hydrogen was fed so that the hydrogen concentration in the gas phase portion might become 2.7% by mol. The polymerization was carried out at a polymerization temperature of 65° C. and a pressure of 2.7 MPa/G.

After the resulting slurry was deactivated, it was sent to a wash tank using liquid propylene, and the polypropylene powder was washed. The resulting slurry was vaporized and then subjected to gas-solid separation to obtain a propylene polymer. The resulting propylene polymer was introduced into a conical dryer and subjected to vacuum drying at 80° C. Subsequently, based on 100 kg of the product, 60 g of pure water and 0.54 liter of propylene oxide were added, then dechlorination treatment was carried out at 90° C. for 2 hours, and thereafter, vacuum drying was carried out at 80° C. to obtain a polypropylene powder.

(4) Pelletization Step

100 Parts by weight of polymer particles of the resulting polypropylene powder were blended with 0.2 part by weight of 3,5-di-t-butyl-4-hydroxytoluene, 0.5 part by weight of tetrakis[methylene-3-(3,5-di-t-butyl-4-hydroxyphenyl)propionate]methane and 0.005 part by weight of calcium stearate, and thereafter, the blend was melted at 230° C. and pelletized by a GMZ50-32 (L/D=32) single screw extruder manufactured by GM Engineering, Inc. The pellets were used as a test sample, and property evaluation was carried out. Further, using the thus prepared pellets as raw materials, a microporous film was produced in the following manner. Property evaluation results of the microporous film are set forth in Table 1 together with the property evaluation results of the pellets.

(5) Production of Microporous Film

A microporous film for use in the measurement of Gurley permeability and piercing strength was produced in the following manner.

Using a sheet-forming machine manufactured by GM Engineering, Inc., the pellets were melt-extruded by a T-die having a width of 200 mm and a lip opening of 2.5 mm at 210° C., and thereafter, the film was taken up at 12 m/min by a chill roll at 110° C. The raw fabric film obtained had a film thickness of 25 μm. Thereafter, using a monoaxial stretching machine manufactured by Iwamoto Seisakusho Co., Ltd., the raw fabric film was cold-stretched to 1.5 times between nip rolls maintained at 35° C., subsequently the film was hot-stretched to 1.5 times by rolls heated to 130° C., and thereafter, the film was relaxed to 0.9 time by rolls heated to 130° C., to obtain a microporous film.

Example 2

A microporous film was obtained in the same manner as in Example 1, except that the polymerization was changed as follows.

(3) Polymerization

To a polymerization vessel having an internal volume of 1000 liters and equipped with a stirrer were continuously fed propylene at 132 kg/hr, the catalyst slurry at 1.4 g/hr as the transition metal catalyst component, triethylaluminum at 8.4 mL/hr and dicyclopentyldimethoxysilane at 16.2 mL/hr, and hydrogen was fed so that the hydrogen concentration in the gas phase portion might become 2.5% by mol. Polymerization was carried out at a polymerization temperature of 74° C. and a pressure of 3.2 MPa/G.

The resulting slurry was sent to a polymerization vessel having an internal volume of 500 liters and equipped with a stirrer, and polymerization was further carried out. To the polymerization vessel, propylene was fed at 29 kg/hr, and hydrogen was fed so that the hydrogen concentration in the gas phase portion might become 1.8% by mol. The polymerization was carried out at a polymerization temperature of 71° C. and a pressure of 3.1 MPa/G.

The resulting slurry was sent to a polymerization vessel having an internal volume of 500 liters and equipped with a stirrer, and polymerization was further carried out. To the polymerization vessel, propylene was fed at 23 kg/hr, and hydrogen was fed so that the hydrogen concentration in the gas phase portion might become 1.5% by mol. The polymerization was carried out at a polymerization temperature of 69° C. and a pressure of 3.1 MPa/G.

After the resulting slurry was deactivated, it was sent to a wash tank using liquid propylene, and the polypropylene powder was washed. The resulting slurry was vaporized and then subjected to gas-solid separation to obtain a propylene polymer. The resulting propylene polymer was introduced into a conical dryer and subjected to vacuum drying at 80° C. Subsequently, based on 100 kg of the product, 60 g of pure water and 0.54 liter of propylene oxide were added, then dechlorination treatment was carried out at 90° C. for 2 hours, and thereafter, vacuum drying was carried out at 80° C. to obtain a polypropylene powder. The resulting polypropylene was pelletized in the same manner as in Example 1. The pellets were used as a test sample, and property evaluation and production of a microporous film were carried out. The results are set forth in Table 1.

Example 3

A microporous film was obtained in the same manner as in Example 1, except that the polymerization was changed as follows.

(3) Polymerization

To a polymerization vessel having an internal volume of 1000 liters and equipped with a stirrer were continuously fed propylene at 136.2 kg/hr, the catalyst slurry at 1.13 g/hr as the transition metal catalyst component, triethylaluminum at 8.2 mL/hr and dicyclopentyldimethoxysilane at 1.6 mL/hr, and hydrogen was fed so that the hydrogen concentration in the gas phase portion might become 2.9% by mol. Polymerization was carried out at a polymerization temperature of 70° C. and a pressure of 3.0 MPa/G.

The resulting slurry was sent to a polymerization vessel having an internal volume of 500 liters and equipped with a stirrer, and polymerization was further carried out. To the polymerization vessel, propylene was fed at 31 kg/hr, and hydrogen was fed so that the hydrogen concentration in the gas phase portion might become 2.2% by mol. The polymerization was carried out at a polymerization temperature of 67° C. and a pressure of 2.9 MPa/G.

The resulting slurry was sent to a polymerization vessel having an internal volume of 500 liters and equipped with a stirrer, and polymerization was further carried out. To the polymerization vessel, propylene was fed at 15 kg/hr, and hydrogen was fed so that the hydrogen concentration in the gas phase portion might become 1.9% by mol. The polymerization was carried out at a polymerization temperature of 65° C. and a pressure of 2.7 MPa/G.

After the resulting slurry was deactivated, it was sent to a wash tank using liquid propylene, and the polypropylene powder was washed. The resulting slurry was vaporized and then subjected to gas-solid separation to obtain a propylene polymer. The resulting propylene polymer was introduced into a conical dryer and subjected to vacuum drying at 80° C. Subsequently, based on 100 kg of the product, 60 g of pure water and 0.54 liter of propylene oxide were added, then dechlorination treatment was carried out at 90° C. for 2 hours, and thereafter, vacuum drying was carried out at 80° C. to obtain a polypropylene powder. The resulting polypropylene was pelletized in the same manner as in Example 1. The pellets were used as a test sample, and property evaluation and production of a microporous film were carried out. The results are set forth in Table 1.

Example 4

A microporous film was obtained in the same manner as in Example 1, except that the polymerization was changed as follows.

(3) Polymerization

To a polymerization vessel having an internal volume of 1000 liters and equipped with a stirrer were continuously fed propylene at 132 kg/hr, the catalyst slurry at 1.4 g/hr as the transition metal catalyst component, triethylaluminum at 8.4 mL/hr and dicyclopentyldimethoxysilane at 16.2 mL/hr, and hydrogen was fed so that the hydrogen concentration in the gas phase portion might become 2.9% by mol. Polymerization was carried out at a polymerization temperature of 74° C. and a pressure of 3.2 MPa/G.

The resulting slurry was sent to a polymerization vessel having an internal volume of 500 liters and equipped with a stirrer, and polymerization was further carried out. To the polymerization vessel, propylene was fed at 29 kg/hr, and hydrogen was fed so that the hydrogen concentration in the gas phase portion might become 2.5% by mol. The polymerization was carried out at a polymerization temperature of 71° C. and a pressure of 3.1 MPa/G.

The resulting slurry was sent to a polymerization vessel having an internal volume of 500 liters and equipped with a stirrer, and polymerization was further carried out. To the polymerization vessel, propylene was fed at 23 kg/hr, and hydrogen was fed so that the hydrogen concentration in the gas phase portion might become 2.0% by mol. The polymerization was carried out at a polymerization temperature of 69° C. and a pressure of 3.1 MPa/G.

After the resulting slurry was deactivated, it was sent to a wash tank using liquid propylene, and the polypropylene powder was washed. The resulting slurry was vaporized and then subjected to gas-solid separation to obtain a propylene polymer. The resulting propylene polymer was introduced into a conical dryer and subjected to vacuum drying at 80° C. Subsequently, based on 100 kg of the product, 60 g of pure water and 0.54 liter of propylene oxide were added, then dechlorination treatment was carried out at 90° C. for 2 hours, and thereafter, vacuum drying was carried out at 80° C. to obtain a polypropylene powder. The resulting polypropylene was pelletized in the same manner as in Example 1. The pellets were used as a test sample, and property evaluation and production of a microporous film were carried out. The results are set forth in Table 1.

Comparative Example 1

A sample of a propylene resin was prepared by the following process in accordance with Example 2 of Japanese Patent Laid-Open Publication No. 1997-52917.

Preparation of Catalyst 300 g of anhydrous magnesium chloride, 1.6 liters of kerosine and 1.5 liters of 2-ethylhexyl alcohol were heated at 140° C. for 3 hours to prepare a homogeneous solution. To the solution, 70 g of phthalic anhydride was added, then they were stirred at 130° C. for 1 hour to dissolve the phthalic anhydride, and thereafter, the solution was cooled down to room temperature. Further, the solution was dropwise added slowly to 8.5 liters of titanium teterachloride having been cooled to −20° C. After completion of the dropwise addition, the temperature was raised up to 110° C., then 215 mL of diisobutyl phthalate was added, and the mixture was stirred for 2 hours. The resulting solid was separated by hot filtration, then the solid was suspended in 10 liters of titanium tetrachloride again, and the suspension was stirred at 110° C. for 2 hours again. The resulting solid was separated by hot filtration, and the solid was washed with n-heptane until titanium came to be not detected substantially in the wash liquid. The resulting solid catalyst component contained 2.2% by weight of titanium and 11.0% by weight of diisobutyl phthalate.

(Polymerization)

An autoclave having an internal volume of 70 liters and having been sufficiently dried and purged with nitrogen was prepared, then a mixture obtained by diluting 2 mL of triethylaluminum with 1000 mL of heptane, 0.8 mL of dicyclohexyldimethoxysilane and 150 mg of the above solid catalyst component were placed, then 20 kg of propylene and 17 N liters of hydrogen were added, and they were polymerized at 70° C. for 2 hours. After the polymerization, unreacted propylene was separated by decantation, and the polymerization product was washed with liquefied propylene three times. Subsequently, to the product were added 0.2 g of water and 10 mL of propylene oxide, and the product was further treated at 90° C. for 15 minutes and dried under reduced pressure for 5 minutes. The treatment with propylene oxide was repeated three times, and the polymer produced was taken out and weighed. As a result, 9.10 kg of polypropylene was obtained.

The resulting polypropylene was pelletized in the same manner as in Example 1. The pellets were used as a test sample, and property evaluation and production of a microporous film were carried out. The results are set forth in Table 1. Since the Mw/Mn and Mz/Mw values were smaller than the lower limits, a microporous film could not be produced.

Comparative Example 2

In order to narrow the molecular weight distribution, 40 ppm of a peroxide (Perkadox 14 manufactured by Kayaku Akzo Corporation) was added to the polypropylene powder obtained in (3) of Example 1, and they were melted at 230° C. and pelletized by a GMZ50-32 (L/D=32) single screw extruder manufactured by GM Engineering, Inc. The pellets were used as a test sample, and property evaluation and production of a microporous film were carried out. The results are set forth in Table 1.

Since the Mz/Mw value was smaller than the lower limit, the resulting microporous film had bad permeability, and the range of the conditions capable of producing a microporous film was narrowed.

Comparative Example 3

A microporous film was obtained in the same manner as in Example 1, except that the polymerization was changed as follows.

(3) Polymerization

To a polymerization vessel having an internal volume of 1000 liters and equipped with a stirrer were continuously fed propylene at 130 kg/hr, the catalyst slurry at 1.3 g/hr as the transition metal catalyst component, triethylauminum at 8.4 mL/hr and di-n-propyldimethoxysilane at 0.8 mL/hr, and hydrogen was fed so that the hydrogen concentration in the gas phase portion might become 0.78% by mol. Polymerization was carried out at a polymerization temperature of 74° C. and a pressure of 3.1 MPa/G.

The resulting slurry was sent to a polymerization vessel having an internal volume of 500 liters and equipped with a stirrer, and polymerization was further carried out. To the polymerization vessel, propylene was fed at 34 kg/hr, and hydrogen was fed so that the hydrogen concentration in the gas phase portion might become 0.64% by mol. The polymerization was carried out at a polymerization temperature of 71° C. and a pressure of 3.0 MPa/G.

The resulting slurry was sent to a polymerization vessel having an internal volume of 500 liters and equipped with a stirrer, and polymerization was further carried out. To the polymerization vessel, propylene was fed at 20 kg/hr, and hydrogen was fed so that the hydrogen concentration in the gas phase portion might become 0.49% by mol. The polymerization was carried out at a polymerization temperature of 69° C. and a pressure of 3.0 MPa/G.

After the resulting slurry was deactivated, it was sent to a wash tank using liquid propylene, and the polypropylene powder was washed. The resulting slurry was vaporized and then subjected to gas-solid separation to obtain a propylene polymer. The resulting propylene polymer was introduced into a conical dryer and subjected to vacuum drying at 80° C. Subsequently, based on 100 kg of the product, 60 g of pure water and 0.54 liter of propylene oxide were added, then dechlorination treatment was carried out at 90° C. for 2 hours, and thereafter, vacuum drying was carried out at 80° C. to obtain a polypropylene powder. The resulting polypropylene was pelletized in the same manner as in Example 1. The pellets were used as a test sample, and property evaluation and production of a microporous film were carried out. The results are set forth in Table 1. Since the mmmm value was smaller than the lower limit, the resulting microporous film had bad permeability, and the range of the conditions capable of producing a microporous film was narrowed.

Comparative Example 4

A sample (PP1) of a propylene resin was prepared by the following process in accordance with Synthesis Example 1 of WO 2010/079799.

(1) Prepolymerization

After a three-neck flask having an internal volume of 0.5 liter and equipped with a stirrer was purged with nitrogen gas, 400 mL of dehydrated haptane, 18 mmol of triethylaluminum, 3.7 mmol of dicyclopentyldimethoxysilane and 4 g of a solid titanium catalyst component (TK200 catalyst manufactured by Mitsui Chemicals, Inc.) were placed. With stirring at an internal temperature of 20° C., propylene was introduced. After 1 hour, stirring was terminated, and as a result, a prepolymerized catalyst in which 2.0 g of propylene had been polymerized based on 1 g of the solid catalyst was obtained.

(2) After a stainless steel autoclave having a propylene polymerization internal volume of 6 liters and equipped with a stirrer was sufficiently dried and purged with nitrogen, 6 liters of dehydrated heptane, 6 mmol of triethylaluminum and 1.2 mmol of dicyclopentyldimethoxysilane were placed. After nitrogen in the system was replaced with propylene, propylene was introduced with stirring.

After the system was stabilized at an internal temperature of 80° C. and a propylene pressure of 0.8 MPa-G, 100 mL of a heptane slurry containing 0.46 mmol (in terms of Ti atom) of the prepolymerized catalyst component was added, and with continuously feeding propylene, polymerization was carried out at 80° C. for 4 hours. After completion of the polymerization, lowering of temperature and pressure release were carried out, subsequently 100 mL of butanol was added, and deashing was carried out at 85° C. for 1 hour. Thereafter, the temperature was lowered again, and the whole quantity of the contents was transferred into a filtration tank equipped with a filter to perform solid-liquid separation. Further, 4 liters of heptane and 2 liters of distilled water were added to perform washing at 70° C., and solid-liquid separation was carried out. Thereafter, vacuum drying was carried out for 4 hours to obtain 3200 g of a propylene powder.

(Preparation of Propylene Homopolymer (PP2))

To the polypropylene powder used in Comparative Example 1, 1500 ppm of a peroxide (Perkadox 14 manufactured by Kayaku Akzo Corporation) was added, and pelletization was carried out by the extruder used in Example 1 to obtain a propylene homopolymer (PP2) having MFR of 250.

The resulting PP1 and PP2 were dry blended in a ratio of 23 wt %/77 wt %, and addition of additives and pelletization were carried out in the same manner as in Example 1. The pellets were used as a test sample, and property evaluation and production of a microporous film were carried out. The results are set forth in Table 1.

Since the Mw/Mn value was larger than the upper limit, variation in film thickness was large. Further, because of a blend, a large number of FE and gels were present in the resulting raw fabric film. Therefore, the microporous film had bad permeability, and the range of the conditions capable of producing a microporous film was narrowed. Evaluation results of the examples and the comparative examples are set forth in Table 1.

is not less than 100,000 but less than 800,000, the value (Mw/Mn) obtained by dividing the weight-average molecular weight by the number-average molecular weight is more than 7.0 but not more than 12.0, and the value (Mz/Mw) obtained by dividing the Z-average molecular weight by the weight-average molecular weight is not less than 3.8 but not more than 9.0, and (2) the mesopentad fraction, as measured by $^{13}$C-NMR (nuclear magnetic resonance method), is not less than 95.5%, and, wherein the polypropylene contains an ultrahigh molecular weight polypropylene having a molecular weight of not less than 7,000,000 in an amount of not less than 0.3% but not more than 1.5%.

2. The polypropylene for a microporous film as claimed in claim 1, which satisfies the following requirement (3):

(3) the Cl content is not more than 5.0 ppm.

3. The polypropylene for a microporous film as claimed in claim 1, which satisfies the following requirement (4):

(4) the amount of a xylene-soluble portion (CXS) at 23° C. is not more than 5.0%.

4. A microporous film comprising the polypropylene for a microporous film as claimed in claim 1.

5. A separator comprising the polypropylene for a microporous film as claimed in claim 1.

6. A filtration film comprising the polypropylene for a microporous film as claimed in claim 1.

7. A separation membrane comprising the polypropylene for a microporous film as claimed in claim 1.

8. A separator used in a battery comprising the polypropylene for a microporous film as claimed in claim 1.

9. A separator used in a condenser comprising the polypropylene for a microporous film as claimed in claim 1.

10. A separator film in a lithium ion secondary battery comprising the polypropylene for a microporous film as claimed in claim 1.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| MFR (g/10 min) | 4.5 | 2.0 | 3.4 | 4.7 | 4.3 | 6.6 | 2.3 | 3.0 |
| Mw | 528000 | 658000 | 580000 | 508000 | 500000 | 460000 | 627000 | 782000 |
| Mw/Mn | 10.4 | 9.6 | 9.8 | 9.8 | 6.9 | 9.5 | 9.6 | 18.3 |
| Mz/Mw | 4.7 | 4.2 | 5.4 | 4.6 | 3.5 | 3.7 | 4.1 | 7.9 |
| Amount of ultrahigh-molecular weight component (%) | 0.7 | 0.6 | 0.5 | 0.4 | 0 | 0.1 | 0.4 | 2.3 |
| mmmm | 0.972 | 0.974 | 0.964 | 0.978 | 0.980 | 0.972 | 0.950 | 0.970 |
| Cl content (ppm) | 2 | 1 | 2 | 2 | 1 | 1 | 2 | 1 |
| CXS (%) | 2 | 2 | 2 | 2 | 2 | 2 | 3 | 2 |
| Molding condition range | ⊚ | ⊚ | ⊚ | ⊚ | x not moldable | Δ | Δ | Δ many gels |
| Gurley permeability (sec/100 ml) | 220 | 200 | 250 | 230 | — no data | 1200 | 600 | 1300 |
| Piercing strength (N) | 3.5 | 4.0 | 3.8 | 3.5 | — no data | 3.0 | 3.2 | 3.0 |

The invention claimed is:

1. Polypropylene for a microporous film, satisfying the following requirements (1) and (2):

(1) the weight-average molecular weight (Mw) value, as determined by gel permeation chromatography (GPC), 11. A filtration film for medical purposes comprising the polypropylene for a microporous film as claimed in claim 1.

12. A separation membrane for medical purposes comprising the polypropylene for a microporous film as claimed in claim 1.

13. A process for producing a microporous film, comprising preparing a raw fabric film of the polypropylene for a microporous film as claimed in claim 1, carrying out a cold stretching step of stretching the thus prepared raw fabric film at a temperature of not lower than 0° C. but lower than 100° C. and carrying out a hot stretching step of stretching the thus cold-stretched film at a temperature of not lower than 100° C. but lower than 170° C.

* * * * *